D. W. McNATT.
EQUALIZER.
APPLICATION FILED OCT. 18, 1911.
1,031,019.
Patented July 2, 1912.
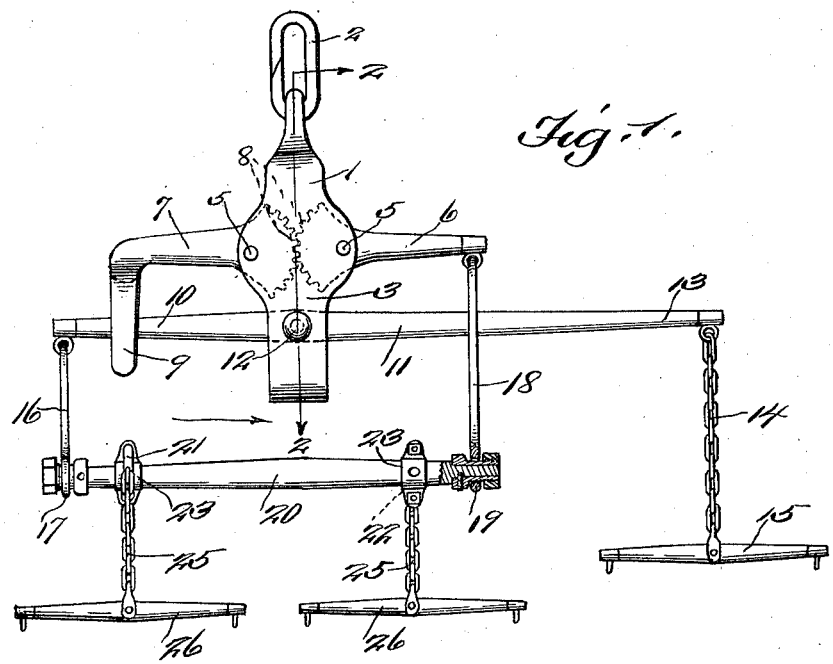
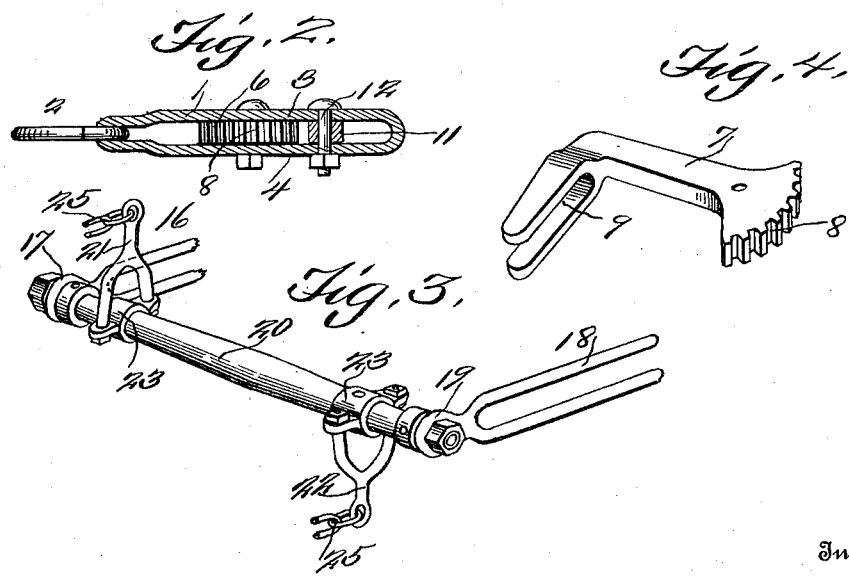

UNITED STATES PATENT OFFICE.

DANIEL W. McNATT, OF GOLDTHWAITE, TEXAS.

EQUALIZER.

1,031,019.  Specification of Letters Patent.  Patented July 2, 1912.

Application filed October 18, 1911. Serial No. 655,407.

*To all whom it may concern:*

Be it known that I, DANIEL W. McNATT, a citizen of the United States, residing at Goldthwaite, in the county of Mills and State of Texas, have invented a new and useful Equalizer; and I do hereby declare the following to be a full, clear, and exact description of the invention, such as will enable others skilled in the art to which it appertains to make and use the same.

This invention relates to draft equalizers, and it particularly pertains to a new and useful device of this nature, whereby the draft may be equally distributed, especially in the case where two horses are pulling against one.

The essential feature of the invention is the production of a main equalizer beam, a pair of pivoted members having gear connections at the rear of the main equalizer beam, in combination with a partially revoluble shaft (which constitutes a double tree), which shaft is provided with connections at one end with the main equalizer beam and at the other end with one of the pivoted members.

A further feature of the invention is the provision of a U-shaped member formed integrally with one end of one of the pivoted members, so as to guide the main equalizer beam. The crotch of the U-shaped member is designed to contact with one end of the main equalizer beam at various times.

The invention comprises further features and combination of parts, as hereinafter set forth, shown in the drawings and claimed.

In the drawings:—Figure 1 is a view in plan of an equalizer constructed in accordance with the invention. Fig. 2 is a sectional view on line 2 2 of Fig. 1. Fig. 3 is a detail view of the partially revoluble shaft. Fig. 4 is a detail view of one of the pivoted members.

Referring more especially to the drawings 1 designates a clevis member, which is provided with a split ring 2 whereby the equalizer may be connected to any suitable wagon, plow or vehicle.

The clevis member 1 comprises the upper and lower plates 3 and 4. Pivoted between the plates on the bolts 5 are the lever members 6 and 7. These members are provided with toothed segmental portions 8, which are arranged in gear, as shown clearly in Fig. 1. The free end of the lever member 7 is U-shaped as shown at 9, which arches the end 10 of the main equalizer beam 11. This main equalizer beam 11 is pivoted on the bolt 12, between the upper and lower plates 3 and 4 of the clevis member 1. Connected to the free end 13 of the main equalizer beam by the usual chain 14 is a swingle tree 15.

Connected to the end 10 of the main equalizer beam is a metal loop 16, one end of which terminates in a supplemental loop 17. Connecting the free end of the lever member 6 is a metal loop 18, one end of which also terminates in a supplemental loop 19. The metal loop 18 guides the main equalizer beam, as it oscillates, while the U-shaped member 9 of the lever member 7 guides the other end 10 of the main equalizer beam.

Revolubly mounted in the supplemental loops 17 and 19 is a partially revoluble shaft 20, which constitutes a double tree. Projecting in opposite directions from the partially revoluble shaft are two members 21 and 22. The forked ends of the members 21 and 22 are connected to the revoluble shaft by the collars 23. This connection is similar to that shown in the Patent No. 972,012. Connected to the members 21 and 22 by means of the chains 25 are the swingle trees 26.

The draft is equally distributed between two animals, which may be connected to the swingle trees 26, through the medium of the partially revoluble shaft, while the draft between said animals and a single animal adapted to be connected to a swingle tree 15 is equalized by means of the main equalizer beam, the metal loops 16 and 18, and the pivoted lever members, which are in gear.

The present invention is an improvement over the patent above named, in that the draft between each of two horses is equalized, in addition to this the draft between said horses and a third horse is equalized.

The invention having been set forth, what is claimed as new and useful is:—

1. In combination, a clevis member, a pair of lever members pivoted therein and arranged in gear, a main equalizer beam pivoted in the clevis member in advance of the lever members, a partially rotatable shaft constituting a double tree and having members projecting therefrom in opposite directions, the partially rotatable shaft having connections with one end of the main equalizer beam, a connection between one end of the revoluble shaft and one of the lever members, swingle trees connected to the members of the revoluble shaft, and a swingle tree connected to one end of the main equalizer beam.

2. In combination, a clevis member, a pair of lever members pivoted therein and arranged in gear, a main equalizer beam pivoted in the clevis member in advance of the lever members, a partially rotatable shaft constituting a double tree and having members projecting therefrom in opposite direction, the partially rotatable shaft having connections with one end of the main equalizer beam, a connection between one end of the revoluble shaft and one of the lever members, swingle trees connected to the members of the revoluble shaft, and a swingle tree connected to one end of the main equalizer beam, the connection between one of the lever members and the revoluble shaft constituting means to guide the main equalizer beam, one of the lever members having a U-shaped portion to guide the other end of the main equalizer beam, the crotch of the U-shaped portion acting as an abutment for the main equalizer beam.

3. In combination, a clevis member, a pair of lever members pivoted therein and arranged in gear, a main equalizer beam pivoted in the clevis member in advance of the lever members, a partially rotatable shaft constituting a double tree and having members projecting therefrom in opposite directions, a metal loop connecting one end of the revoluble shaft and one end of the main equalizer beam, a metal loop connecting one of the lever members and the other end of the revoluble shaft, the said last named loop acting as a guide for a portion of the main equalizer beam, one of the lever members having a U-shaped portion for guiding another portion of the main equalizer beam, swingle trees connected to the members of the revoluble shaft, and a swingle tree connected to one end of the main equalizer beam.

In testimony whereof I have signed my name to this specification in the presence of two subscribing witnesses.

DANIEL W. McNATT.

Witnesses:
TOM FORD,
R. J. EDWARDS.

Copies of this patent may be obtained for five cents each, by addressing the "Commissioner of Patents, Washington, D. C."